(12) United States Patent
Pandit et al.

(10) Patent No.: US 9,195,626 B2
(45) Date of Patent: Nov. 24, 2015

(54) REDUCING WRITE I/O LATENCY USING ASYNCHRONOUS FIBRE CHANNEL EXCHANGE

(71) Applicant: Emulex Corporation, Costa Mesa, CA (US)

(72) Inventors: Parav Kanaiyalal Pandit, Bangalore (IN); James W. Smart, Windham, NH (US)

(73) Assignee: EMULEX CORPORATION, Costa Mesa, CA (US)

( * ) Notice: Subject to any disclaimer, the term of this patent is extended or adjusted under 35 U.S.C. 154(b) by 222 days.

(21) Appl. No.: 13/752,974

(22) Filed: Jan. 29, 2013

(65) Prior Publication Data

US 2014/0215108 A1 Jul. 31, 2014

(51) Int. Cl.
*G06F 13/42* (2006.01)
*G06F 3/06* (2006.01)

(52) U.S. Cl.
CPC ............ *G06F 13/4282* (2013.01); *G06F 3/067* (2013.01); *G06F 3/0611* (2013.01); *G06F 3/0659* (2013.01)

(58) Field of Classification Search
CPC . G60F 13/42; G06F 13/4221; G06F 13/4226; G06F 13/4282
USPC .......................... 710/105, 52, 4; 370/252, 401
See application file for complete search history.

(56) References Cited

U.S. PATENT DOCUMENTS

| | | | | |
|---|---|---|---|---|
| 6,005,849 A | * | 12/1999 | Roach et al. | 370/276 |
| 2005/0108476 A1 | * | 5/2005 | Tanaka et al. | 711/114 |
| 2005/0117522 A1 | * | 6/2005 | Basavaiah et al. | 370/252 |
| 2008/0008202 A1 | * | 1/2008 | Terrell et al. | 370/401 |
| 2009/0307378 A1 | * | 12/2009 | Allen et al. | 710/4 |
| 2012/0110222 A1 | * | 5/2012 | Dang et al. | 710/52 |
| 2012/0159003 A1 | * | 6/2012 | Craig et al. | 710/7 |

OTHER PUBLICATIONS

Fibre Channel Framing and Signaling—4 (FC-FS-4), INCITS, Aug. 5, 2014, Rev 1.10.*

* cited by examiner

*Primary Examiner* — Tim T Vo
*Assistant Examiner* — Phong H Dang
(74) *Attorney, Agent, or Firm* — McAndrews, Held & Malloy, Ltd.

(57) ABSTRACT

A FCP initiator sends a FCP write command to a FCP target within a second FC Exchange, and the target sends one or more FC write control IUs to the initiator within a first FC Exchange to request a transfer of data associated with the write command. The first and second FC exchanges are distinct from one another. A payload of each write control IU includes an OX_ID value with which the initiator originated the second Exchange and a RX_ID value assigned by the FCP target for the second exchange. The two Exchanges yield a full-duplex communication environment between the initiator and target that enables the reduction or elimination of latencies incurred in a conventional FCP write I/O operation due to the half-duplex nature of a single FC Exchange. The write control IU may be an enhanced FCP_XFER_RDY IU or a new FC IU previously undefined by the FCP standard.

20 Claims, 12 Drawing Sheets

FIG. 6

```
TARGET ORIGINATES AWCE WITH INITIATOR THAT SUPPORTS AWCE CAPABILITY  602
```

FIG. 7

```
TARGET RECEIVES FROM THE INITIATOR A WRITE COMMAND IU THAT ORIGINATES A WIOE  702
```
↓
```
ASYNCHRONOUS TO WIOE, EACH TIME THE TARGET DETERMINES IT HAS NOT YET REQUESTED FROM
THE INITIATOR ALL THE DATA ASSOCIATED WITH THE WRITE COMMAND IU RECEIVED WITHIN THE WIOE
AND THAT BUFFER SPACE IS AVAILABLE TO RECEIVE AT LEAST SOME OF THE UNREQUESTED DATA, THE
TARGET SENDS A WRITE CONTROL IU TO THE INITIATOR WITHIN THE AWCE TO INDICATE THE TARGET IS
PREPARED TO RECEIVE AT LEAST SOME OF THE DATA.

THE TARGET MAY SEND THE WRITE_CONTROL IU WITHIN THE AWCE CONCURRENTLY WITH THE
INITIATOR SENDING DATA IUS WITHIN THE WIOE.
THE WRITE_CONTROL IU SPECIFIES THE OX_ID OF THE WIOE AND AN RX_ID THAT ENABLES THE
INITIATOR TO LEARN THE RX_ID OF THE WIOE (E.G., IN THE WRITE_CONTROL IU PAYLOAD OX_ID AND
RX_ID FIELDS).  704
```

FULL-DUPLEX WRITE I/O OPERATION USING
ASYNCHRONOUS WRITE CONTROL EXCHANGE (AWCE)

REDUCING WRITE I/O LATENCY USING ASYNCHRONOUS FIBRE CHANNEL EXCHANGE

BACKGROUND

The following is an excerpt from the Introduction to the American National Standard for Information Technology—Fibre Channel Protocol for SCSI (FCP), Fourth Version (FCP-4), approved Oct. 12, 2011, INCITS 481-2011, which is incorporated by reference herein in its entirety for all purposes.

The Small Computer System Interface (SCSI) command set is widely used and applicable to a wide variety of device types. The transmission of SCSI command set information across Fibre Channel links allows the large body of SCSI application and driver software to be successfully used in the high performance Fibre Channel environment.

This standard describes the protocol for transmitting SCSI commands, data, and status using Fibre Channel FC-FS-3 Exchanges and Information Units. Fibre Channel is a high-speed serial architecture that allows either optical or electrical connections. The topologies supported by Fibre Channel include point-to-point, fabric switched, and arbitrated loop. All Fibre Channel connections use the same standard frame format and standard hierarchy of transmission units to transmit the Information Units that carry SCSI information.

The American National Standard for Information Technology—Fibre Channel Framing and Signaling (FC-FS-3), approved Dec. 28, 2011, INCITS 470-2011, is also incorporated by reference herein in its entirety for all purposes.

A conventional SCSI write command according to the FCP standard involves the following steps, which are described in more detail below. First, a FCP initiator sends a SCSI write command to a FCP target encapsulated in a FCP command frame. The target responds with a transfer ready message, which is a data delivery request, in which the target indicates to the initiator the amount of buffer space available to receive the write data. The initiator responds by sending the amount of data the target indicated it could receive. The target then sends another transfer ready message again indicating the amount of buffer space available and the initiator sends more data. This back and forth process repeats until all the data has been transferred and the target returns status to the initiator to complete the command. Due to current limitations of the FCP standard that will now be described, the initiator must effectively wait to send the data until it has received the relevant transfer ready message, and the target must wait to send (all but the first of) the transfer ready messages until it has received the data associated with the previous transfer ready message. This increases the latency of the FCP write I/O operation.

The FCP defines an Exchange as the basic mechanism that transfers information consisting of one or more related non-concurrent Sequences that may flow in the same or opposite directions. The Exchange is identified by an Originator Exchange_ID (OX_ID) and a Responder Exchange_ID (RX_ID). The FCP defines a Sequence as set of one or more data frames with a common Sequence_ID (SEQ_ID), transmitted unidirectionally from one N_Port to another N_Port with a corresponding response, if applicable, transmitted in response to each data frame. Thus, an Exchange between a FCP initiator port and a FCP target port may be viewed as a half duplex operation. That is, the Sequences within an Exchange can be transferred in only one direction at a time between. The port that is authorized to send a Sequence in a given point in time is referred to as holding the Sequence Initiative. In a typical FCP write I/O operation, the initiator transfers the Sequence Initiative to the target in the last data frame of the Sequence. The target responds with the transfer ready message, which transfers the Sequence Initiative back to the initiator so it can send more data frames (or the status frame). Thus, a half duplex handshaking occurs via the passing back and forth of the Sequence Initiative.

The FCP defines an Information Unit (IU) as an organized collection of data specified by the Fibre Channel Protocol to be transferred as a single Sequence by the Fibre Channel service interface. The FCP standard maps a SCSI I/O operation, such as a SCSI I/O write operation, into a single Fibre Channel Exchange, which means the IUs are transferred between the initiator and target in non-concurrent Sequences, that is, in a half duplex manner, as described above. Thus in the above example, while the data IU is being transferred from the initiator to the target, the target is not permitted to send another transfer ready IU to the initiator to notify the initiator of additional buffer space until the initiator transfers the Sequence Initiative to the target, even though the buffer space may have become available in the target well before the initiator transfers the Sequence Initiative to the target. Consequently, there is latency introduced into the FCP write I/O operation because of the half-duplex nature of the single Exchange in which the target and initiator perform the write I/O operation.

More specifically, there are multiple components of the latency introduced by the half-duplex nature of a single Exchange. First, there is the transmission time to transmit from the initiator to the target over the FC fabric the data frame that transfers the Sequence Initiative from the initiator to the target. The transmission time includes transmission medium delay (e.g., copper wire or fiber optic cable propagation delay) as well as any delay introduced by switches in the FC fabric along the path between the target and initiator. Second, there is the target processing time from when the target receives the Sequence Initiative-transferring data frame until it transmits the transfer ready IU, which transfers Sequence Initiative back to the initiator. The processing time is taken by the target hardware and/or firmware to process the Sequence Initiative-transferring data frame to determine that the target now has the Sequence Initiative to transmit the transfer ready IU. Third, there is the transmission time to transmit the transfer ready IU from the target to the initiator over the FC fabric. Fourth, there is the initiator processing time from when the initiator receives the Sequence Initiative-transferring transfer ready IU until it transmits the first data frame of the next Sequence. This is time taken by the initiator hardware and/or firmware to process the Sequence Initiative-transferring transfer ready IU.

The sum of these latencies introduced by the half-duplex nature of the single Exchange in which the target and initiator perform the write I/O operation has been observed to be on the order of tens of microseconds in some cases, which may significantly reduce performance of the system. Where the target is a mechanical hard disk drive, tape drive or other peripheral device having a relatively large access time (e.g., rotation latency and/or seek times on the order or milliseconds), the half-duplex Exchange-induced latency may have been small relative to the peripheral access time when viewing the entire write I/O operation time. However, with the advent of new low access time peripherals, such as solid-state disks (SSDs), and considering cases of high peripheral cache hit rates, the half-duplex Exchange-induced latency has become even more significant. Furthermore, longer cable distances through the FC fabric between the target and initiator may exacerbate the latency, particularly the transmission times, as may longer paths through the FC fabric, e.g., due to larger number of switch hops. Finally, large I/O write sizes may further exacerbate the latency, particularly in cases in which a relatively large number of transfer ready IUs must be sent in a given Exchange.

BRIEF SUMMARY

Embodiments are described that provide an additional FC Exchange, referred to as an asynchronous write control Exchange (AWCE), that enables some of the latencies associated with the conventional single half-duplex FCP write I/O Exchange to be reduced or eliminated. The target sends write control IUs (for example, enhanced transfer ready FCP IUs or a new FC IU previously undefined by the FCP-4) to the initiator on the AWCE in a pipelined fashion to notify the initiator that the target is ready to receive data (e.g., buffer space is available) without having to wait for the initiator to transfer the Sequence Initiative of the Exchange originated by the initiator sending the FCP write command IU. In this way, the FCP write I/O operation has a full-duplex nature due to the AWCE in combination with the Exchange originated by the initiator, which may significantly reduce the latency for a single write I/O operation as well as overall performance of a system performing many such write I/O operations.

In one aspect embodiments provide a Fibre Channel (FC) Protocol for SCSI (FCP) target. The FCP target includes a FC port and a processor adapted to communicate with a FCP initiator via the FC port. The FCP target is configured to send one or more FC write control information units (IUs) to the FCP initiator within a first FC exchange to request a transfer of data associated with a FCP write command IU previously sent to the FCP target by the FCP initiator within a second FC exchange. The first FC exchange is distinct from the second FC exchange. A payload of each of the one or more write control IUs includes an originator exchange identifier (OX_ID) value with which the FCP initiator originated the second exchange and a responder exchange identifier (RX_ID) value assigned by the FCP target for the second exchange.

In another aspect embodiments provide a Fibre Channel (FC) Protocol for SCSI (FCP) initiator. The FCP initiator includes a FC port and a processor adapted to communicate with a FCP target via the FC port. The FCP initiator is configured to receive one or more FC write control information units (IUs) from the FCP target within a first FC exchange requesting a transfer of data associated with a FCP write command IU previously sent to the FCP target by the FCP initiator within a second FC exchange. The first FC exchange is distinct from the second FC exchange. A payload of each of the one or more write control IUs includes an originator exchange identifier (OX_ID) value with which the FCP initiator originated the second exchange and a responder exchange identifier (RX_ID) value assigned by the FCP target for the second exchange.

In yet another aspect embodiments provide a method that includes a Fibre Channel (FC) Protocol for SCSI (FCP) target sending one or more FC write control information units (IUs) to an FCP initiator within a first FC exchange to request a transfer of data associated with a FCP write command IU previously sent to the FCP target by the FCP initiator within a second FC exchange. The first FC exchange is distinct from the second FC exchange. A payload of each of the one or more write control IUs includes an originator exchange identifier (OX_ID) value with which the FCP initiator originated the second exchange and a responder exchange identifier (RX_ID) value assigned by the FCP target for the second exchange.

BRIEF DESCRIPTION OF THE DRAWINGS

FIG. 6 is a flowchart illustrating the origination of an AWCE.

FIG. 7 is a flowchart illustrating operation of the target to send write_control IUs.

DETAILED DESCRIPTION OF THE EMBODIMENTS

Glossary

A FC port is a FC link control facility (LCF) that includes a transmitter and a receiver for transmitting and receiving Fibre Channel frames on a FC link. A FC port has a distinct address identifier.

A FC write control information unit (IU) is one or more FC frames sent by a FCP target to a FCP initiator to request a transfer of data associated with a FCP write command received by the FCP target.

A FC Exchange is the basic mechanism that transfers information consisting of one or more related non-concurrent FC Sequences that may flow in the same or opposite directions. An Originator Exchange_ID (OX_ID) and a Responder Exchange_ID (RX_ID) identify the Exchange. A FC Sequence is a set of one or more FC data frames with a common Sequence_ID (SEQ_ID), transmitted unidirectionally from one FC N_Port to another N_Port.

A FCP initiator is a FCP node that sends FCP command IUs to a FCP target. An example of FCP an initiator is a FCP host bus adapter.

FCP target is a FCP node that receives FCP command IUs from a FCP initiator. Examples of FCP targets include storage devices, such as disk drives, solid state disks (SSDs), tape drives, CDROM drives, and the like.

A FCP write command IU is a FCP command (FCP_CMND) IU that has the WRDATA bit of the payload set to a value of one to indicate the initiator expects to transmit FCP data (FCP_DATA) IUs to the target. It should be understood that a FCP write command IU is not limited to a FCP_CMND IU that encapsulates a SCSI WRITE command, but instead includes other SCSI commands that implicate writing data from the initiator to the target.

Figure 1:
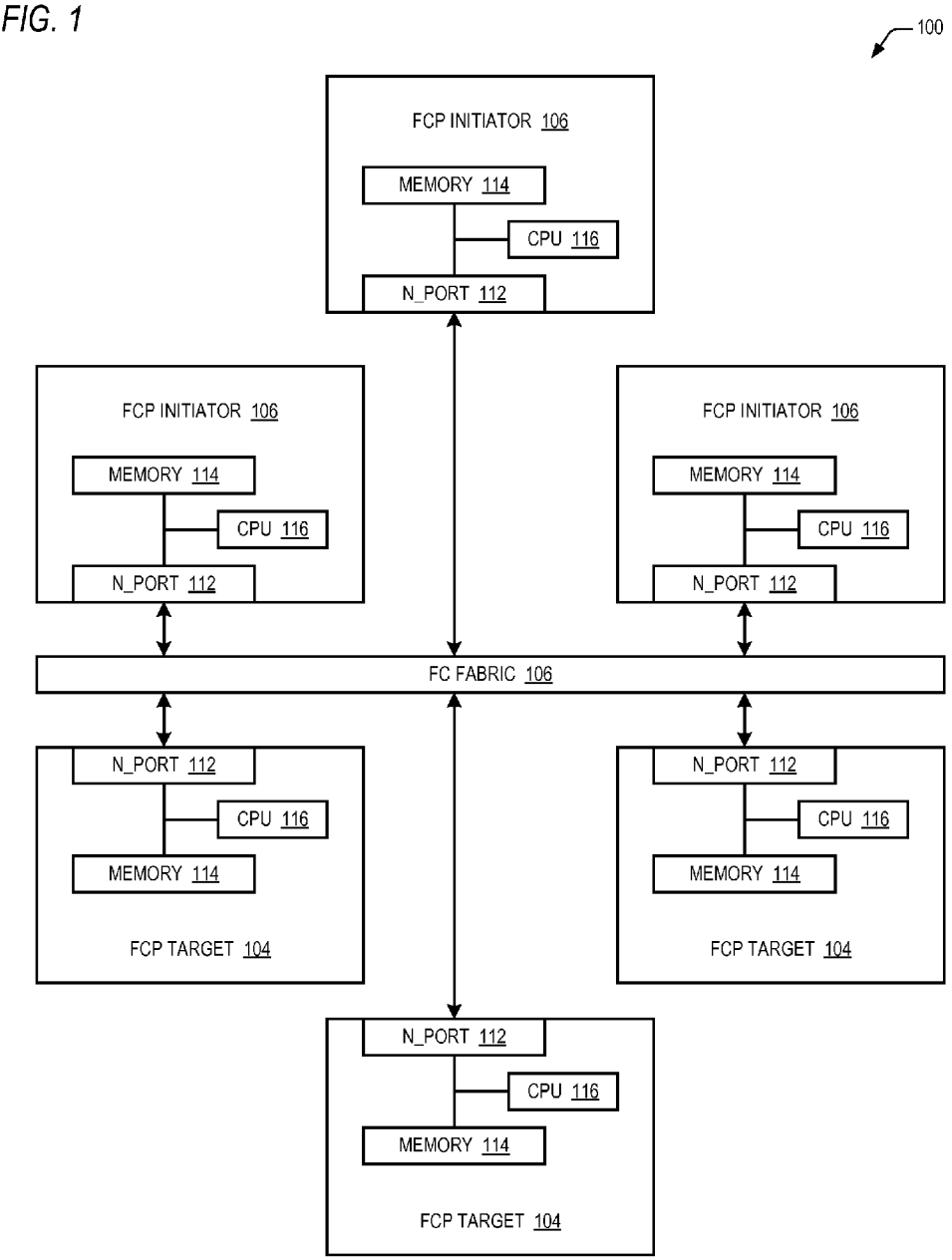
FIG. 1 is a block diagram illustrating a system comprising a Fibre Channel (FC) network according to an embodiment.

Referring now to FIG. 1, a block diagram illustrating a system comprising a Fibre Channel (FC) network 100 according to an embodiment is shown. The network 100 includes a FC fabric 106 connecting a plurality of FCP initiators 102 and FCP targets 104, referred to generically as FC nodes 102/104. Each FC node 102/104 includes a FC N_Port 112, a memory 114 and a CPU 116. The N_Ports 112 are coupled to FC ports (not shown) of the FC fabric 106 via FC links. The FC links are pairs of unidirectional transmission mediums for transmitting in opposite directions, such as copper wire or optical fiber cables as described in the FC specifications or other transmission media that may be subsequently developed and employed in a FC network. The FC fabric may include FC switches or other entities that interconnect the N_Ports and are capable of routing FC frames using the information in a FC frame header.

The N_Port 112 of each node 102/104 includes a Link Control Facility (LCF) for transmitting and receiving FC frames. The N_Port 112 may include intelligence, in the form of hardware and/or software, to process incoming and outgoing FC frames. The memory 114 includes buffer space for buffering FC frames. The N_Port 112 receives FC frames from the memory 114 for transmission on the FC link and writes to the memory 114 FC frames received from the FC link. The CPU 116 may process FC frames for sending and receiving by the N_Port 112. Additionally, the CPU 116 may manage the buffer space in the memory 114. The various actions described herein performed by the FC nodes 102/104 including conventional FC node 102/104 operation as well as the enhanced asynchronous write control exchange (AWCE) capability may be performed by the N_Port 112, the CPU 116 or a combination thereof.

Figure 2:
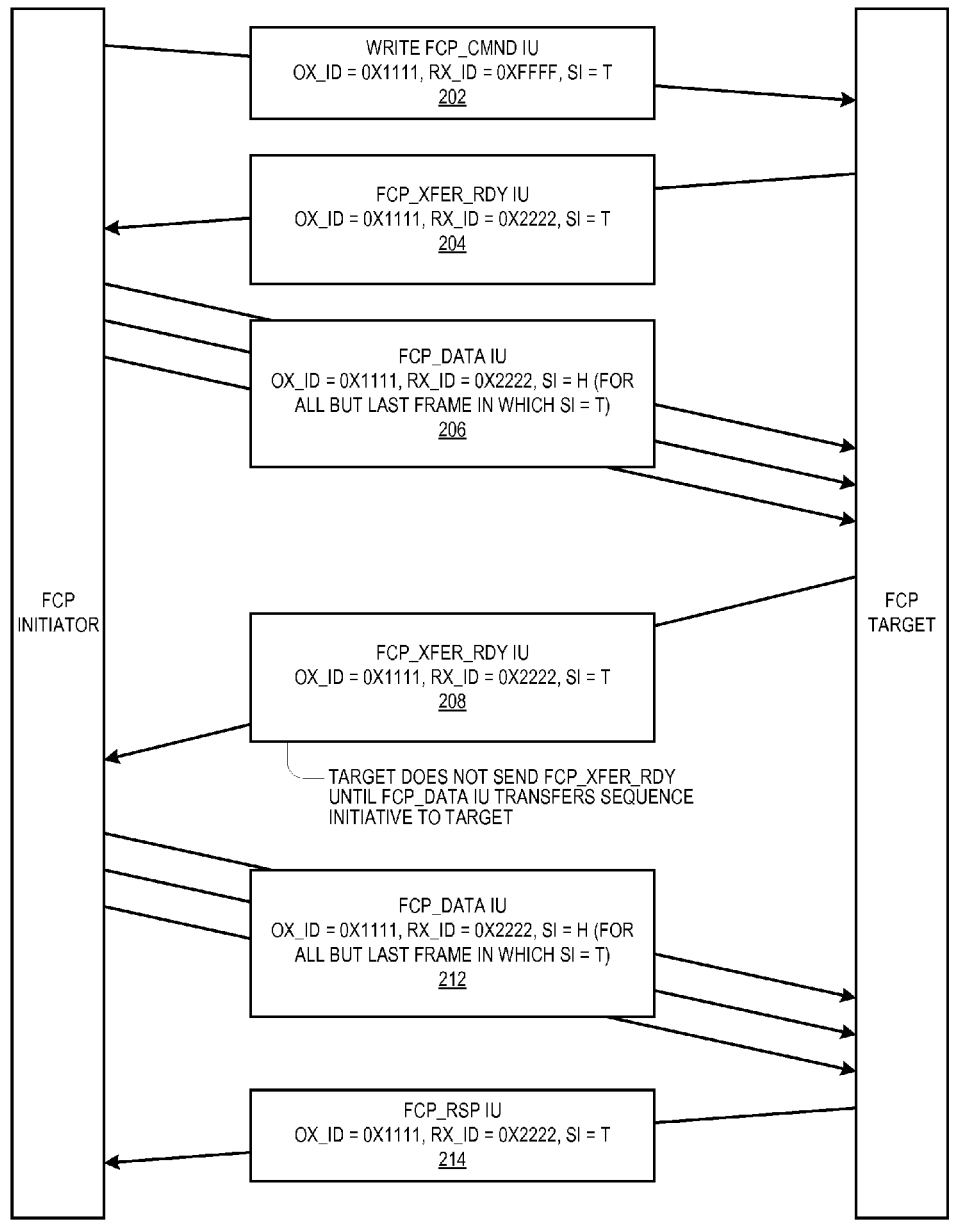
FIG. 2 is a flow diagram illustrating the flow of FC frames between a FCP initiator and a FCP target according to a conventional FCP write I/O operation.

Referring now to FIG. 2, a flow diagram illustrating the flow of FC frames between a FCP initiator and a FCP target according to a conventional FCP write I/O operation is shown. The initiator sends to the target a FCP_CMND IU 202 that specifies a command for which the initiator writes data to the target. The FCP_CMND IU 202 originates an FC Exchange within which the write I/O operation is performed by the initiator and target in a half-duplex fashion as described above and described in more detail here. The frame header of the FCP_CMND IU specifies an originator exchange identifier (OX_ID), which in the example of FIG. 2 has a value of 0x1111; a responder exchange identifier (RX_ID), which in the example of FIG. 2 has a value of 0xFFFF; and a Sequence Initiative (SI) bit, which in the example of FIG. 2 has a value of one to cause the Sequence Initiative to be transferred to the target. It should be noted that if the FCP_CMND IU is to utilize the FCP FIRST BURST feature, then the initiator retains the Sequence Initiative after sending the FCP_CMND IU.

In response to the FCP_CMND IU 202, the target sends the initiator a FCP_XFER_RDY IU 204. The frame header of the FCP_XFER_RDY IU 204 specifies the OX_ID value received in the FCP_CMND IU, which in the example of FIG. 2 has a value of 0x1111; a RX_ID assigned by the target which the initiator learns, which in the example of FIG. 2 has a value of 0x2222; and a SI bit, which in the example of FIG. 2 has a value of one to cause the Sequence Initiative to be transferred back to the initiator.

In response to the FCP_XFER_RDY IU 204, the initiator sends the target a FCP_DATA IU 206. The frame header of the FCP_DATA IU 206, as do the remainder of the FC frame headers sent within the FC Exchange described in FIG. 2, specifies the OX_ID value of 0x1111 and the RX_ID value of 0x2222. The SI bit has a value of zero to cause the Sequence Initiative to be held by the initiator for all but the last FC frame of the Sequence, which has a SI bit value of one to cause the Sequence Initiative to be transferred back to the target.

In response to the last frame of the FCP_DATA IU 206, the target sends the initiator another FCP_XFER_RDY IU 208 similar to IU 204. However, the second FCP_XFER_RDY IU 208 has different FCP_DATA_RO and FCP_BURST_LEN values than the first FCP_XFER_RDY IU 204. Importantly, according to conventional operation, the target does not send the FCP_XFER_RDY IU 208 until the FCP_DATA IU transfers the Sequence Initiative to the target due to the half-duplex nature of the single FC Exchange in which the conventional write I/O operation is performed.

In response to the second FCP_XFER_RDY IU 208, the initiator sends the target a second FCP_DATA IU 212, similar to the first FCP_DATA IU 206 but having different data in its payload.

In response to the last frame of the FCP_DATA IU 212, the target sends the initiator a FCP_RSP IU 214 that includes, among other things, the SCSI status associated with the write I/O operation. Typically via the FCP_RSP IU 214, the target terminates the FC Exchange that was originated by the initiator via the FCP_CMND IU 202.

As may be observed from FIG. 2, the various latencies described above and below with respect to FIG. 13 may be incurred during a write I/O operation performed according to the conventional half-duplex single FC Exchange paradigm.

Figure 3:
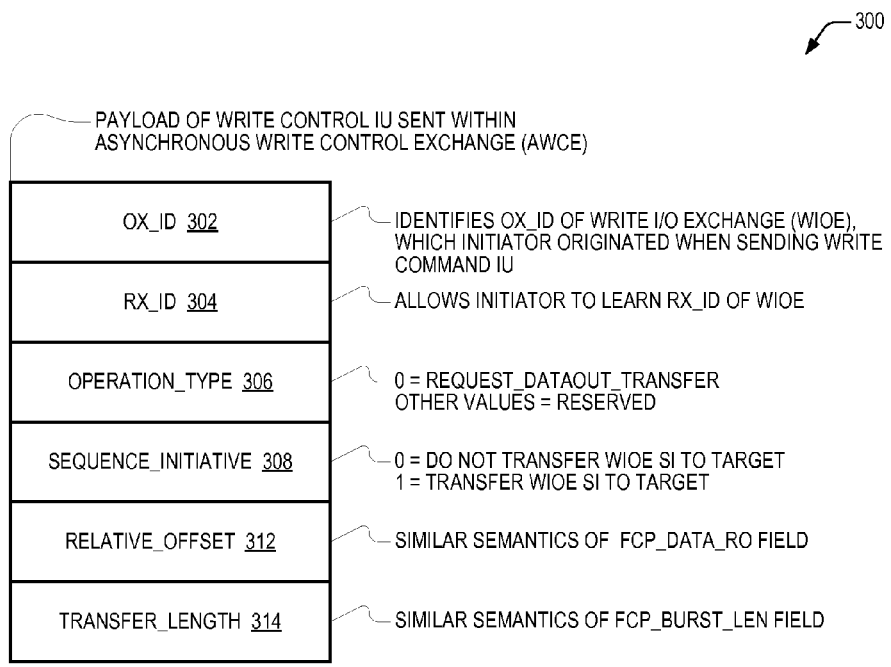
FIG. 3 is a block diagram illustrating the payload of a write_control IU according to an embodiment.

Referring now to FIG. 3, a block diagram illustrating the payload of a write_control IU 300 according to an embodiment is shown. The write_control IU 300 may have in its R_CTL field of its FC frame header a value that is currently unused by the FS-FS standard (for example, 0x04) to distinguish it from other IUs, such as the FCP_XFER_RDY (however, see FIG. 12 for an alternate embodiment that employs an enhanced FCP_XFER_RDY IU as a write_control IU 1200). The write_control IU 300 payload includes an OX_ID field 302, an RX_ID field 304, an operation_type field 306, a sequence_initiative field 308, a relative_offset field 312 and a transfer_length field 314.

The target 104 populates the OX_ID field 302 with the value of the OX_ID field of the header of the write command IU (FCP_CMND) received from the initiator 102 that originated the write I/O Exchange (WIOE). The WIOE is a different FC Exchange than the FC Exchange within which the target 104 sends the write_control IU 300 to the initiator 102, which is referred to as an asynchronous write control Exchange (AWCE). The WIOE and AWCE in combination form a full-duplex mode of communication between the initiator 102 and target 104. This enables the target 104, even though it does not have Sequence Initiative on the WIOE, to notify the initiator 102 within the AWCE that the initiator 102 can send data associated with the write I/O, as discussed in more detail below.

The target 104 populates the RX_ID field 304 with a value chosen by the target 104 that enables the initiator 102 to learn the RX_ID value of the WIOE. In conventional operation, the initiator 102 would learn the RX_ID value of the WIOE within the WIOE, that is, from a FC frame sent by the target 104 to the initiator 102 within the WIOE. However, according to the embodiments described herein, the initiator 102 learns the RX_ID value of the WIOE within the AWCE rather than within the WIOE, as described in more detail below. In this way, the OX_ID field 302 and RX_ID field 304 enable the initiator 102 to identify the write command IU for which the payload of the write_control IU 300, namely the relative_offset 312 and transfer_length 314 fields, is requesting a data transfer. The initiator 102 populates the OX_ID and RX_ID fields of the FC header of each FC frame of the FCP_DATA IU sent within the WIOE with the values provided by the target 104 in the OX_ID field 302 and RX_ID field 304, respectively, of the write_control IU 300.

The operation_type field 306 indicates the type of operation being requested by the write_control IU 300. In one embodiment, a value of zero indicates a request_dataout_transfer, that is, a request for the initiator 102 to transfer data of the associated write command IU to the target 104, similar to a FCP_XFER_RDY IU. Other values of the operation_type field 306 are reserved or may be used as described in alternate embodiments below.

The sequence_initiative field 308 instructs the initiator 102 whether to transfer the Sequence Initiative of the WIOE to the target 104 (value=1) or to not transfer the Sequence Initiative of the WIOE to the target 104 (value=0) via the last frame of the FCP data IU sent within the WIOE by the initiator 102 to the target 104 in response to the write_control IU 300. In one embodiment, the target 104 may set the transfer_length field 314 to zero to allow the initiator 102 to send a data IU with no payload, but which transfers the Sequence Initiative to the target 104, which may in turn allow the target 104 to send a FCP_RSP IU within the WIOE to the initiator 102 in cases of an error.

When the operation_type field 306 specifies a request_dataout_transfer, the relative_offset 312 and transfer_length 314 fields have similar semantics to the FCP_DATA_RO and FCP_BURST_LEN fields, respectively, of the FCP_XFER_RDY IU. That is, the relative_offset field 312 specifies the position of the first byte of data requested by the write_control IU 300 relative to the first byte of all the data transferred by the write command IU, and the transfer_length field 314 specifies the number of bytes of data the target 104 is requesting, e.g., the amount of buffer space the target 104 is prepared to receive in the next FCP_DATA IU.

Figure 4:
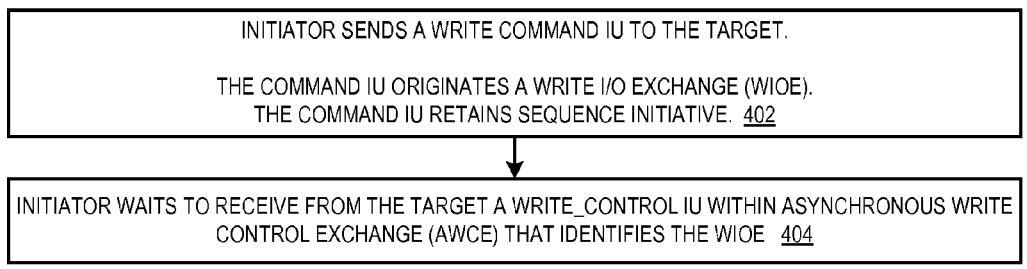
FIG. 4 is a flow chart illustrating operation of a FCP initiator to send a FCP write command IU to a FCP target 104 according to an embodiment.
Figure 5:
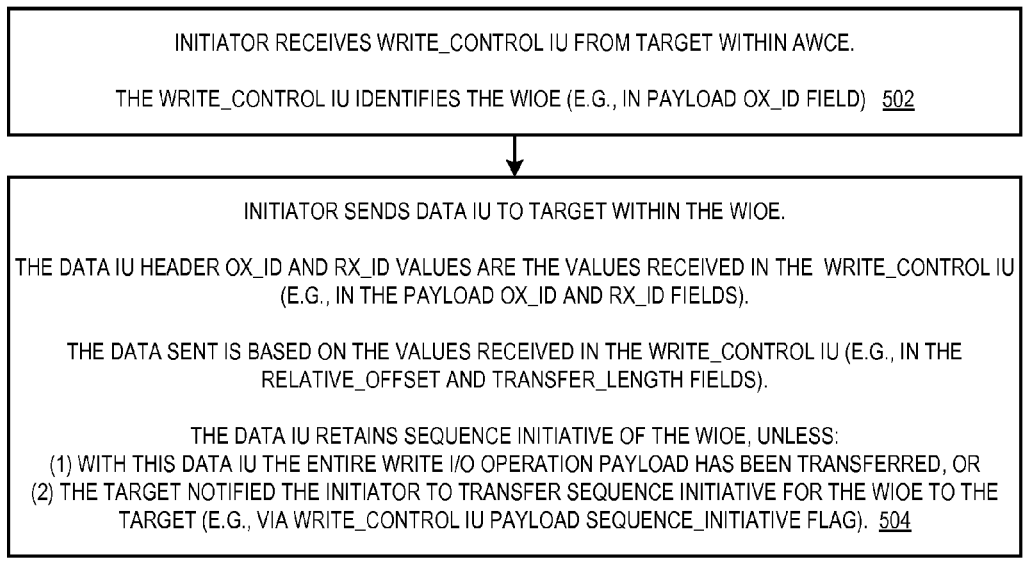
FIG. 5 is a flow chart illustrating operation of the initiator to transfer data to the target associated with a FCP write command IU as sent according to FIG. 4 according to an embodiment.
Figure 8:
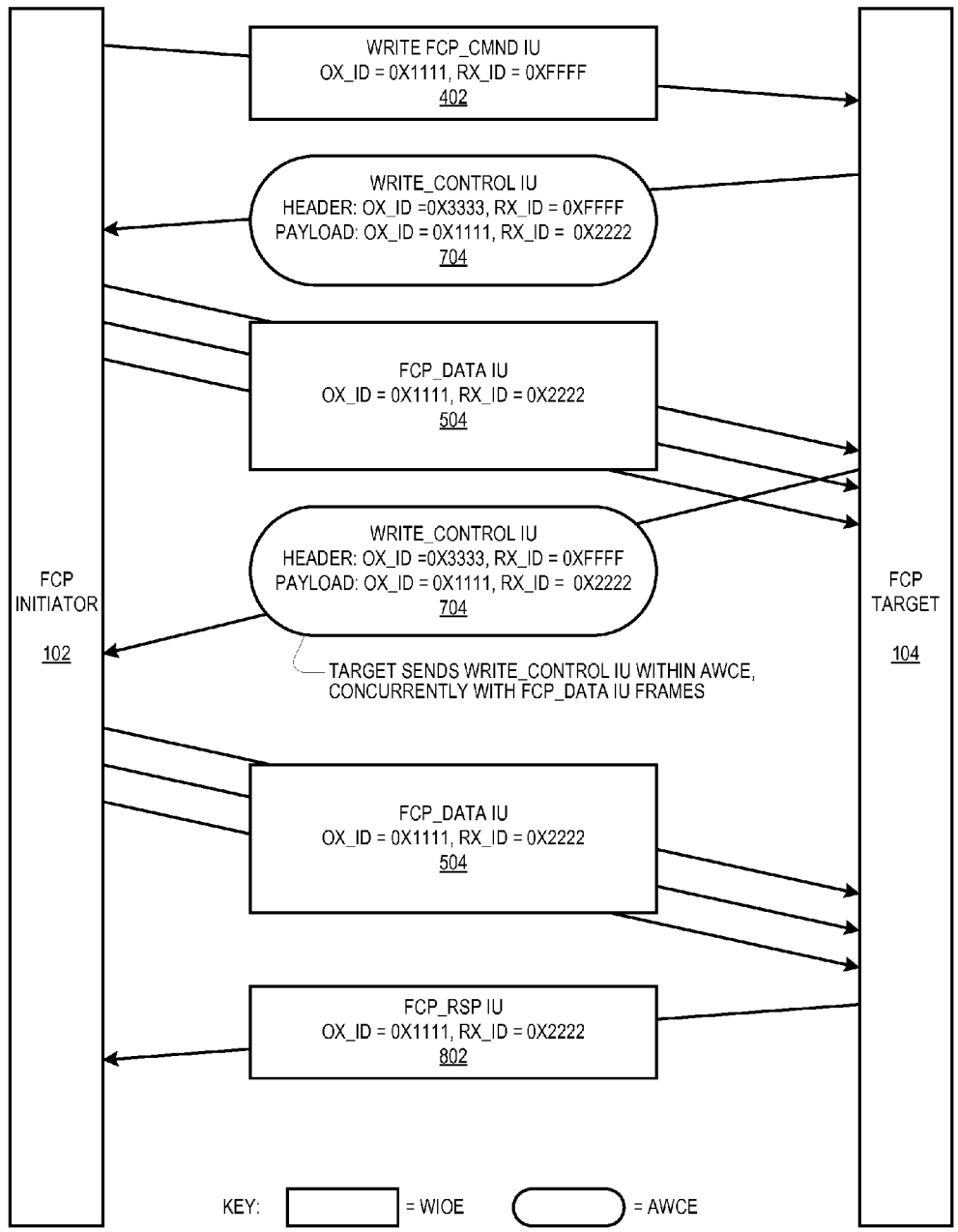
FIG. 8 is a flow diagram illustrating the flow of FC IUs between a FCP initiator and a FCP target of the system of FIG. 1 to perform a FCP write I/O operation according to the operation of the initiator and target described with respect to the flowcharts of FIGS. 4 through 7.

FIGS. 4 and 5 describe operation of the initiator 102, FIGS. 6 and 7 describe operation of the target 104, and FIG. 8 describes combined operation of the initiator 102 and target 104, according to embodiments.

Referring now to FIG. 4, a flow chart illustrating operation of a FCP initiator 102 to send a FCP write command IU to a FCP target 104 according to an embodiment is shown. Flow begins at block 402.

At block 402, the initiator 102 sends a FCP write command IU to the target 104. The write command IU originates a WIOE with the target 104. The write command IU specifies a SCSI command that involves the initiator 102 writing data to the target 104. Specifically, the WRDATA bit of the FCP_CMND IU payload is set to a value of one to indicate the initiator 102 expects to transmit FCP_DATA IUs to the target 104. The write command IU is similar to a conventional FCP write command IU; however, unconventionally, preferably the write command IU retains Sequence Initiative of the WIOE. Advantageously, this enables the initiator 102 to send data IUs to the target 104 within the WIOE concurrently with the target 104 sending write_control IUs 300 to the initiator 102 within the AWCE to reduce the latency associated with a FCP write IO operation, as described herein. The OX_ID field of the write command IU frame header will contain a value that the initiator 102 guarantees to be unique with respect to the OX_ID of any other open FC Exchange with the target 104. The target 104 will remember the write command IU frame header OX_ID field and use the value to populate the OX_ID field 302 of the write_control IU 300 it sends at block 704 of FIG. 7. Flow proceeds to block 404.

At block 404, the initiator 102 waits to receive from the target 104 a write_control IU 300 that identifies the WIOE and requests a data transfer from the initiator 102. In this way, the initiator 102 learns the RX_ID value of the WIOE. The initiator 102 knows that it will receive the write_control IU 300 from the target 104 within a different Exchange than the WIOE, namely the AWCE. The origination of the AWCE is described in more detail below with respect to FIG. 6. Various embodiments are contemplated for the initiator 102 to know that it will receive the write_control IU 300 from the target 104 within an AWCE rather than within the WIOE at block 404 and for the initiator 102 to know that it should not transfer the Sequence Initiative to the target 104 when sending the write command IU at block 402. In a preferred embodiment, the initiator 102 and target 104 communicate with one another during an initialization time to determine whether they support the AWCE capability and only employ the capability if both support it. For example, the target 104 and initiator 102 may communicate using the process login (PRLI) or port login (PLOGI), which are described in the FC standards. Flow ends at block 404.

It should be understood that during operation of the system 100, the initiator 102 may send multiple write command IUs to the target 104 according to block 402, and multiple of the write command IUs may be outstanding at a given point in time. Thus, multiple WIOEs between the initiator 102 and the target 104 may be open at a given point in time. Further, it should be understood that the initiator 102 may send write command IUs to multiple targets 104 of the system 100, and the WIOEs between the initiator 102 and the multiple targets 104 may be open at a given point in time. Finally, it should be understood that multiple initiators 102 of the system 100 may send write command IUs to the targets 104, and the WIOEs between the initiators 102 and the targets 104 may be open at a given point in time.

Referring now to FIG. 5, a flow chart illustrating operation of the initiator 102 to transfer data to the target 104 associated with a FCP write command IU as sent according to FIG. 4 according to an embodiment is shown. Flow begins at block 502.

At block 502, the initiator 102 receives a write_control IU 300 from the target 104 within an AWCE. The sending of the write_control IU 300 by the target 104 within the AWCE is described with respect to FIG. 7 below. The AWCE is a different FC Exchange than the FC Exchange within which the initiator 102 sent the write command IU, which is referred to as the WIOE as described above with respect to FIG. 4. The origination of the AWCE is described below with respect to FIG. 6. The write_control IU 300 identifies the WIOE within which the write command IU was sent and therefore identifies the write command IU for which the write_control IU 300 is requesting data. That is, the write_control IU 300 identifies one of the write command IUs sent at block 402. Specifically, the write_control IU 300 OX_ID field 302 identifies the OX_ID of the WIOE, and the write_control IU 300 RX_ID field 304 value enables the initiator 102 to learn the RX_ID value of the WIOE and to use the learned RX_ID value in the RX_ID field of the FC headers of the data IU frames sent at block 504. The target 104 chooses the RX_ID value of the WIOE at block 704 of FIG. 7. Flow proceeds to block 504.

At block 504, the initiator 102 sends a data IU (FCP_DATA IU) to the target 104 within the WIOE identified in the write_control IU 300 received at block 502. That is, the initiator 102 populates the OX_ID and RX_ID fields of the header of each FC frame of the data IU with the values of the OX_ID 302 and RX_ID 304 fields, respectively, that were received in the write_control IU 300 at block 502. The data IU includes in its payload the data requested by the write_control IU 300 received at block 502 in its relative_offset 312 and transfer_length 314 fields. Preferably, the initiator 102 retains the Sequence Initiative of the WIOE. That is, the initiator 102 clears the Sequence Initiative bit to zero in each of the FC frames of the data IU sent to the target 104 in order to hold the Sequence Initiative. This is a change from the conventional FCP operation in which the initiator 102 would transfer the Sequence Initiative to the target 104 so that the target 104 could send a FCP_XFER_FDY IU to request more data, as described above with respect to FIG. 2. Advantageously, the initiator 102 need not transfer the WIOE Sequence Initiative to the target 104 because the target 104 is able to asynchronously request the next data via the AWCE. That is, the target 104 is able to send the write_control IUs 300 to the initiator 102 within the AWCE (concurrently with the initiator 102 sending the data IUs within the WIOE) without having to wait for the initiator 102 to transfer Sequence Initiative of the WIOE to the target 104. The initiator 102 transfers Sequence Initiative of the WIOE to the target 104 via the data IU only if: (1) all of the data for the write command IU has been sent, that is, with this data IU the entire amount of the data associated with the write command IU has been transferred; or (2) the target 104 notified the initiator 102 to transfer the WIOE Sequence Initiative to the target 104, for example via the sequence_initiative field 308 of the write_control IU 300 received at block 502. Flow ends to block 504.

It should be understood that the initiator 102 performs the operations of FIG. 5 as many times as necessary to transfer all the data specified by the write command IU sent at block 402. Similarly, the target 104 performs the operation at block 704 of FIG. 7 described below as many times as necessary to request transfer of all the data specified by the write command IU received at block 702. The operations of FIG. 5 and the operation of block 702 are purposely not shown in a loop and not shown in sequence with one another because the sending of the write_control IUs 300 at block 702 and the sending of data IUs at block 504 may advantageously be performed concurrently with one another within the respective AWCE and WIOE in a full duplex fashion to reduce the latency associated with a FCP write command IU. That is, the target 104 may send the write_control IUs 300 within the AWCE asynchronously with respect to the sending of the write command IUs within the WIOE by the initiator 102. Stated alternatively, the target 104 is enabled to send the write_control IUs 300 within the AWCE without holding Sequence Initiative of the WIOE.

Referring now to FIG. 6, a flowchart illustrating the origination of an AWCE is shown. Flow begins at block 602.

At block 602, a target 104 originates a FC Exchange, an AWCE, with an initiator 102 that supports the AWCE capability. Specifically, the target 104 clears to zero the Exchange Context bit of the F_CTL field of the write command IU frame header to indicate the target 104 is the Originator of the Exchange, that is, of the AWCE. Preferably, the target 104 originates the AWCE in response to a write command IU received from the initiator 102. As discussed in more detail below, the target 104 may originate the AWCE in response to each write command IU received, such as described below with respect to FIG. 10. However, in other embodiments the target 104 may service multiple write command IUs using a single AWCE, such as described below with respect to FIG. 9. In one embodiment, the target 104 may employ the same AWCE for the entire process login session with the initiator 102. Furthermore, other embodiments are contemplated in which the target 104 originates the AWCE at a time other than in response to a write command IU received from the initiator 102, for example at an initialization time, such as a port login or process login. In such embodiments, the target 104 may populate the operation_type field 306 with a value (other than request_dataout_transfer) to indicate that the target 104 is originating the AWCE without respect to a particular WIOE, in which case the value of the OX_ID field 302 will be ignored by the initiator 102. Such embodiments may be particularly compatible with embodiments in which the target 104 services multiple write command IUs using a single AWCE. Still further, embodiments are contemplated in which the target 104 originates and terminates multiple AWCEs within a given write I/O operation, such as each time it wants to send a write_control IU 300 of multiple write_control IUs 300 for a write I/O operation. Finally, other embodiments are contemplated in which the initiator 102 originates the AWCE and subsequently transfers Sequence Initiative of the AWCE to the target 104. For example, the initiator 102 may send the target 104 a write_control IU 300 with a value (other than request_dataout_transfer) of the operation_type field 306 to indicate that the initiator 102 is originating the AWCE. In this case, the initiator 102 will transfer Sequence Initiative to the target 104 after originating the AWCE.

It should be understood that during operation of the system 100, multiple AWCEs between the initiator 102 and the target 104 might be open at a given point in time. Further, it should be understood that AWCEs between the initiator 102 and multiple targets 104 might be open at a given point in time. Finally, it should be understood that AWCEs between multiple initiators 102 and multiple targets 104 may be open at a given point in time.

Referring now to FIG. 7, a flowchart illustrating operation of the target 104 to send write_control IUs 300 is shown. Flow begins at block 702.

At block 702, the target 104 receives from the initiator 102 a FCP write command IU. The write command IU originates a WIOE, as described above with respect to block 402 of FIG. 4. Flow proceeds to block 704.

At block 704, the target 104 sends one or more write_control IUs 300 to the initiator 102 within an AWCE to notify the initiator 102 that the target 104 is ready to receive data associated with the write command IU received at block 702. As described above with respect to block 502 of FIG. 5, each write_control IU 300 identifies the WIOE within which the write command IU was received at block 702 and therefore identifies the write command IU for which the write_control IU 300 is requesting data. Specifically, the write_control IU 300 OX_ID field 302 identifies the OX_ID of the WIOE, and the write_control IU 300 RX_ID field 304 value enables the initiator 102 to learn the RX_ID value of the WIOE and to use the learned RX_ID value in the RX_ID field of the FC headers of the data IU frames sent at block 504. The target 104 chooses the RX_ID value of the WIOE and guarantees it to be unique with respect to the RX_ID of any other open FC Exchange with the initiator 102. The target 104 sends the one or more write_control IUs 300 to the initiator 102 one at a time. However, advantageously, embodiments described herein enable the target 104 to send the one or more write_control IUs 300 to the initiator 102 within the AWCE concurrently with the initiator 102 sending data IUs to the target 104 within the WIOE originated by the write command IU and asynchronously to the initiator 102 transferring Sequence Initiative of the WIOE to the target 104, thereby reducing or even eliminating many of the latencies associated with the conventional FCP write I/O operation described above with respect to FIG. 2, for example. An embodiment is also described with respect to FIG. 11 in which a single write_control IU 300 may request data for multiple write command IUs associated with multiple corresponding WIOEs. The target 104 sends a write_control IU 300 each time it determines that it has not yet requested all of the data associated with the write command IU and that it is ready (e.g., has buffer space) to receive some of the unrequested data. Various algorithms are contemplated for determining the minimum amount of buffer space available before sending the write_control IU 300. Flow ends at block 704.

Referring now to FIG. 8, a flow diagram illustrating the flow of FC IUs between a FCP initiator 102 and a FCP target 104 of the system 100 of FIG. 1 to perform a FCP write I/O operation according to the operation of the initiator 102 and target 104 described with respect to the flowcharts of FIGS. 4 through 7 is shown. Two different FC Exchanges are shown in FIG. 8: a WIOE and an AWCE. FC IUs sent within the WIOE are shown within rectangular boxes having square corners, whereas FC IUs sent within the AWCE are shown within rectangular boxes having rounded corners. As may observed from FIG. 8 and as discussed more below, the sending of at least one write_control IU 300 by the target 104 to the initiator 102 within the AWCE is asynchronous to and concurrent with the sending of FCP data IU frames by the initiator 102 to the target 104 within the WIOE.

As described at block 402 of FIG. 4, the initiator 102 sends a write command IU (FCP_CMND) IU to the target 104, which originates the WIOE. The frame header of the write command IU specifies an OX_ID that in the example of FIG. 8 has a value of 0x1111, and a RX_ID that in the example of FIG. 8 has a value of 0xFFFF. Preferably, the write command IU does not cause the Sequence Initiative of the WIOE to be transferred to the target 104.

As described at block 704 of FIG. 7, in response to receiving the write command IU, when the target 104 is ready (e.g., buffer space is available) to receive data specified by the write command IU, the target 104 sends the initiator 102 a write_control IU 300 within an AWCE. According to one embodiment, the sending of the write_control IU 300 originates the AWCE; whereas, according to other embodiments, the AWCE may have already been originated before the target 104 received the write command IU. The frame header of the write_control IU 300 specifies an OX_ID value selected by the target 104 for the AWCE, which in the example of FIG. 8 has a value of 0x3333, and a RX_ID value, which in the example of FIG. 8 has a value of 0xFFFF. The payload OX_ID field 302 of the write_control IU 300 specifies the WIOE OX_ID value, which in the example of FIG. 8 has a value of 0x1111. The payload RX_ID field 304 of the write_control IU 300 specifies a RX_ID assigned by the target 104 for the WIOE that the initiator learns, which in the example of FIG. 8 has a value of 0x2222. Preferably, the write_control IU 300 does not cause the Sequence Initiative of the AWCE to be transferred to the initiator 102.

As described at block 504 of FIG. 5, in response to receiving the write_control IU 300, the initiator 102 sends the target 104 a data IU whose payload includes the data requested by the received write_control IU 300, namely the data specified in the relative_offset field 312 and transfer_length field 314. The frame header of the data IU specifies the WIOE OX_ID value of 0x1111 and RX_ID value of 0x2222. Preferably, the initiator 102 does not cause the Sequence Initiative to be transferred back to the target 104.

As described at block 704 of FIG. 7, when the target 104 is ready (e.g., buffer space is available) to receive data specified by the write command IU, and realizing that it has not yet received all the data specified by the write command IU, the target 104 sends the initiator 102 a second write_control IU 300 within the AWCE, as described at block 704. The second write_control IU 300 is similar to the first; however, the relative_offset field 312 and transfer_length field 314 values are updated to reflect the next portion of the data. The target 104 may send the write_control IU 300 concurrently with the sending of the data IU by the initiator 102 since they are being sent on two different FC Exchanges, namely the WIOE and the AWCE. The AWCE enables the target 104 to request the data from the initiator 102 as soon as the target 104 is ready (e.g., buffer space is available) to receive data without having to wait for the initiator 102 to transfer the WIOE Sequence Initiative to the target 104. This advantageously reduces or eliminates much of the latency incurred by a conventional FCP write I/O operation as described in more detail with respect to FIGS. 13 and 14. As described herein, the AWCE may be terminated during the write I/O operation (preferably via the last write_control IU 300 sent by the target 104), as described with respect to the embodiment of FIG. 10; alternatively, the AWCE may remain open in order to service other write I/O operations, as described with respect to the embodiment of FIG. 9.

As described at block 504 of FIG. 5, in response to receiving the second write_control IU 300, the initiator 102 sends the target 104, within the WIOE, a second data IU whose payload includes the data requested by the received second write_control IU 300. In the example of FIG. 8, this is the last data IU, so the initiator 102 causes the Sequence Initiative to be transferred back to the target 104. It should be understood that although only two data IUs and two write_control IUs 300 are sent in the example of FIG. 8, more than two could be sent in other FCP write I/O operations. Furthermore, it should be understood that because of the asynchronous nature of the target 104 sending the write_control IUs 300 within the AWCE, the write_control IUs 300 could actually get ahead of the data IUs if buffer space quickly became available within the target 104 because, for example, the target 104 freed a data buffer associated with another initiator 102 or with a different write I/O operation. For example, the target 104 could have started sending the second write_control IU 300 before any of the data IU frames arrived, or even before they were sent, as described with respect to FIG. 14.

In response to receiving the last data IU from the initiator 102, which transfers Sequence Initiative to the target 104, the target 104 sends the initiator 102 a response IU (FCP_RSP IU), within the WIOE, that includes the status of the write I/O operation, including the SCSI status associated with the SCSI command that was included in the write command IU. The target 104 terminates the WIOE via the response IU, namely by setting the Last_Sequence bit of the F_CTL field to one in the response IU.

As may be observed from FIG. 8, the employment of the AWCE effectively allows pipelining of the communication between the initiator 102 and target 104 to accelerate the generation of the data transfer request IUs relative to the conventional FCP approach, thereby reducing, and in some cases eliminating, write I/O operation latency.

Figure 9:
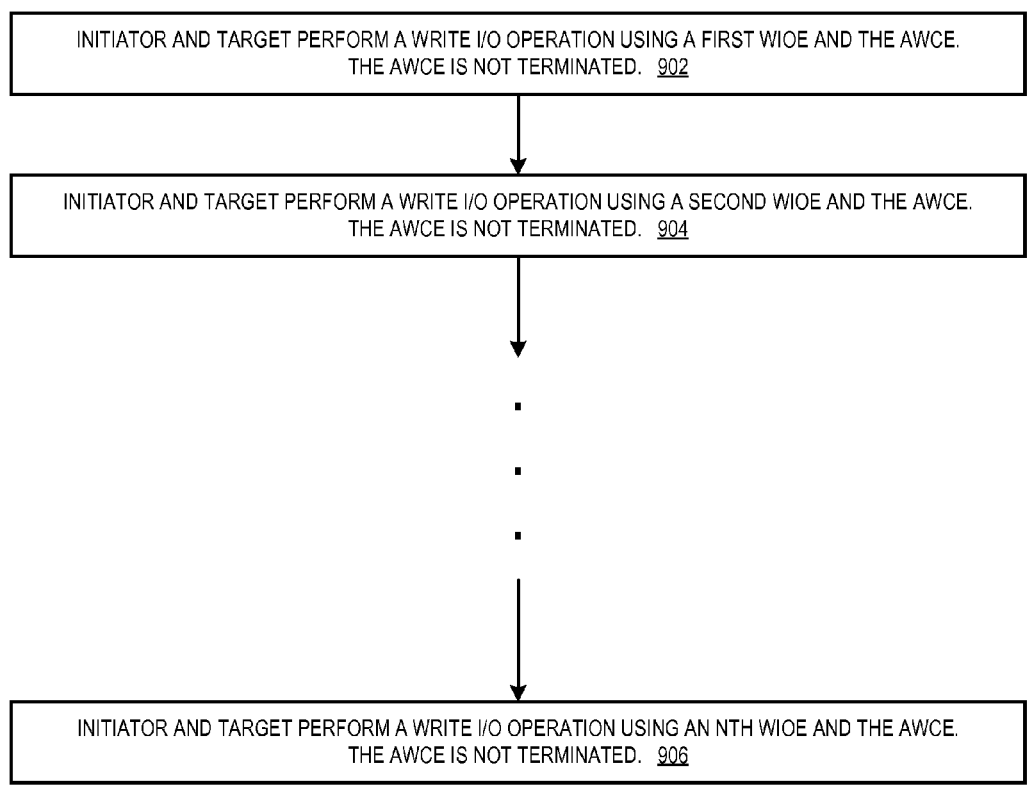
FIG. 9 is a flow diagram illustrating one embodiment of the manner in which an initiator and a target perform multiple write I/O operations.

Referring now to FIG. 9, a flow diagram illustrating one embodiment of the manner in which an initiator 102 and a target 104 perform multiple write I/O operations is shown. According to the embodiment of FIG. 9, the initiator 102 and target 104 perform multiple write I/O operations using a single AWCE. Flow begins at block 902.

At block 902, the initiator 102 and target 104 perform a first write I/O operation using a first WIOE and an AWCE, such as the example write I/O operation described in FIG. 8. The AWCE is not terminated. Flow proceeds to block 904.

At block 904, the initiator 102 and target 104 perform a second write I/O operation using a second WIOE and the AWCE that was used to perform the first write I/O operation. The AWCE is not terminated. Flow proceeds to block 906.

At block 906, the initiator 102 and target 104 perform an Nth write I/O operation using an Nth WIOE and the AWCE that was used to perform the first N−1 write I/O operations. The target 104 terminates the AWCE, for example in response to the initiator 102 logging out. Flow ends at block 906.

Figure 10:
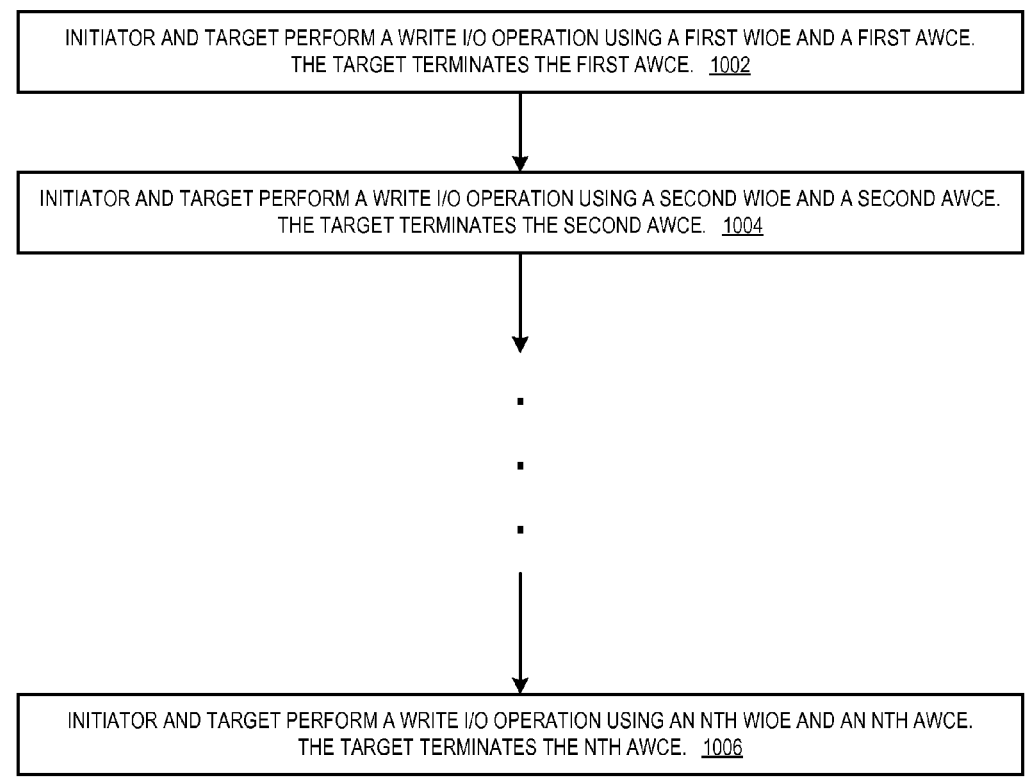
FIG. 10 is a flow diagram illustrating an alternate embodiment of the manner in which an initiator and a target perform multiple write I/O operations.

Referring now to FIG. 10, a flow diagram illustrating an alternate embodiment of the manner in which an initiator 102 and a target 104 perform multiple write I/O operations is shown. According to the embodiment of FIG. 10, the initiator 102 and target 104 perform multiple write I/O operations each of which employs its own respective AWCE. Flow begins at block 1002.

At block 1002, the initiator 102 and target 104 perform a first write I/O operation using a first WIOE and a first AWCE, such as the example write I/O operation described in FIG. 8. Preferably, in the embodiment of FIG. 10, the target 104 originates the AWCE via the first write_control IU 300 sent to the initiator 102 in response to receiving the write command IU. Subsequently, the target 104 terminates the first AWCE, for example after sending the last write_control IU 300 to request the last data of the write I/O operation. Flow proceeds to block 1004.

At block 1004, the initiator 102 and target 104 perform a second write I/O operation using a second WIOE and a second AWCE. Subsequently, the target 104 terminates the second AWCE. Flow proceeds to block 1006.

At block 1006, the initiator 102 and target 104 perform an Nth write I/O operation using an Nth WIOE and an Nth AWCE. Subsequently, the target 104 terminates the Nth AWCE. Flow ends at block 1006.

Figure 11:
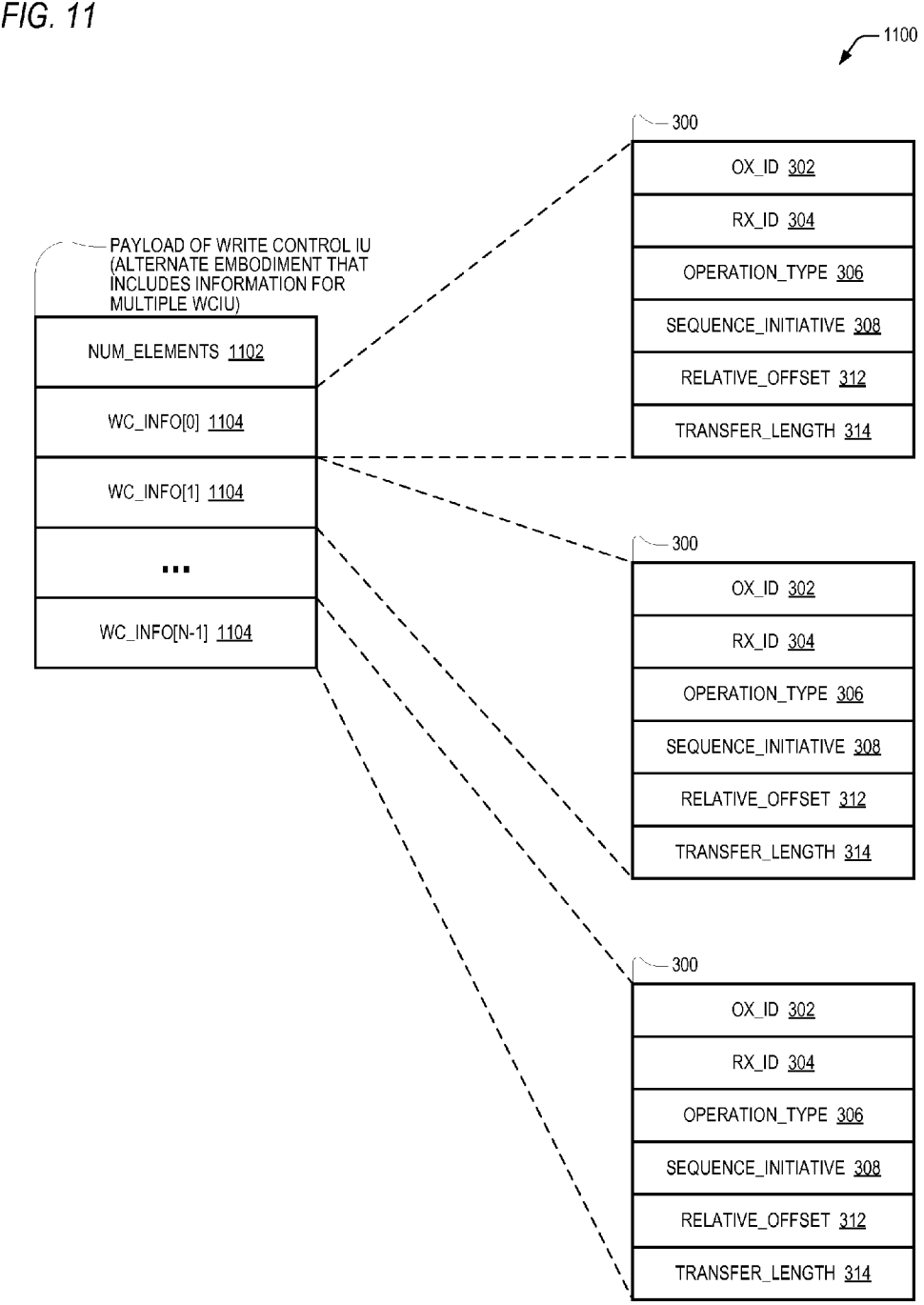
FIG. 11 is a block diagram illustrating the payload of a write_control IU according to an alternate embodiment.

Referring now to FIG. 11, a block diagram illustrating the payload of a write_control IU 1100 according to an alternate embodiment is shown. The write_control IU 1100 payload includes a num_elements field 1102 and a plurality of wc_info fields 1104, denoted as an array of elements [0], [1] and so forth to [N−1]. As shown, each wc_info field 1104 includes sub fields that correspond to the fields of the write_control IU 300 of FIG. 3, namely the OX_ID field 302, the RX_ID field 304, the operation_type field 306, the sequence_initiative field 308, the relative_offset field 312 and the transfer_length field 314. The value of the num_elements field 1102 indicates the number of valid wc_info 1104 fields. Each wc_info field 1104 specifies a WIOE via the OX_ID field 302 and RX_ID field 304. Also, each wc_info field 1104 specifies the data being requested within the specified WIOE via the relative_offset 312 and transfer_length 314 fields when the operation_type field 306 indicates a request_dataout_transfer. Finally, each wc_info field 1104 specifies whether the initiator 102 is to transfer the WIOE Sequence Initiative to the target 104 via the corresponding data IU.

Figure 12:
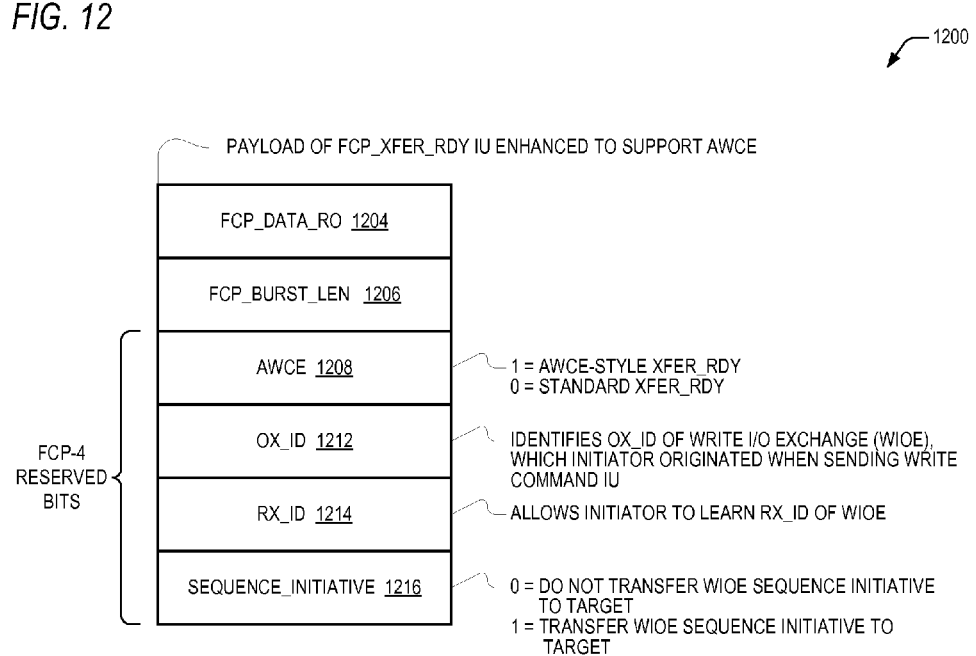
FIG. 12 is a block diagram illustrating the payload of a write_control IU 1200, which is an enhanced FCP_XFER_RDY IU, according to an alternate embodiment.

Referring now to FIG. 12, a block diagram illustrating the payload of a write_control IU 1200, which is an enhanced FCP_XFER_RDY IU, according to an alternate embodiment is shown. The write_control IU 1200 payload includes the conventional FCP_DATA_RO 1204 and FCP_BURST_LEN 1206 fields for specifying the data being requested, which perform a function similar to the relative_offset 312 and transfer_length 314 fields of the write_control IU 300 of FIG. 3. However, the write_control IU 1200 of FIG. 12, that is, the enhanced FCP_XFER_RDY IU, also includes an AWCE flag 1208, an OX_ID field 1212, a RX_ID field 1214, and a sequence_initiative field 1216, all of which are included in bits of the payload of the write_control IU 1200 that are reserved by the FCP-4 standard in the payload of a conventional FCP_XFER_RDY IU. The OX_ID field 1212, the RX_ID field 1214, and the sequence_initiative field 1216 function similarly to their counterparts in the write_control IU 300 of FIG. 3, namely the OX_ID field 302, the RX_ID field 304, and the sequence_initiative field 308 of the write_control IU 300. If the AWCE flag 1208 is set to one, then the initiator 102 interprets the write_control IU 1200 frame as an enhanced FCP_XFER_RDY IU, that is, the values of the OX_ID field 1212, the RX_ID field 1214, and the sequence_initiative field 1216 are valid and should be used. However, if the AWCE flag 1208 is cleared to zero, then the initiator 102 interprets the frame as a conventional FCP_XFER_RDY IU, that is, the values of the OX_ID field 1212, the RX_ID field 1214, and the sequence_initiative field 1216 are not valid and should not be used.

Figure 13:
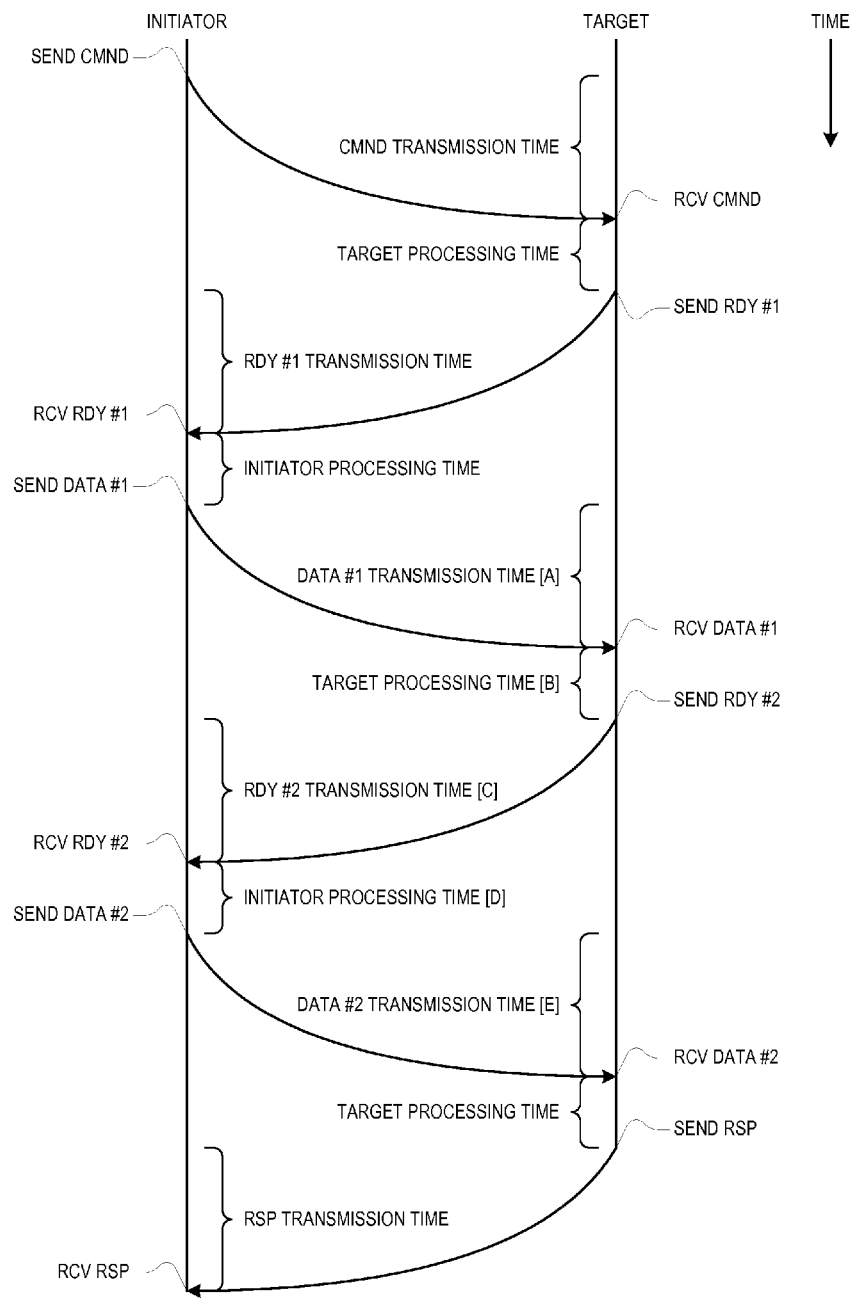
FIG. 13 is a timing diagram illustrating latencies associated with a conventional FCP write I/O operation such as described in FIG. 2.

Referring now to FIG. 13, a timing diagram illustrating latencies associated with a conventional FCP write I/O operation such as described in FIG. 2 is shown. Within FIGS. 13 and 14, various latencies are denoted with capital letters within square brackets, such as "[A]." As may be observed from FIG. 13, the various latencies associated with the conventional FCP write I/O operation are incurred sequentially such that they add up to the total latency of the FCP write I/O operation. In particular, the processing latency [B] required for the target 104 to detect that the FC Exchange Sequence Initiative has been transferred to it and to begin transmitting the second FCP_XFER_RDY IU cannot start until the last frame of the FCP_DATA IU has been received, that is, the transmission latency [A] of the first FCP_DATA IU has been incurred. Similarly, the transmission latency [C] associated with the second FCP_XFER_RDY IU cannot start until the last frame of the first FCP_DATA IU has been received, that is, until the transmission latency [A] of the first FCP_DATA IU has been incurred and the target 104 processing time [B] has been incurred. Furthermore, the processing latency [D] required for the initiator 102 to detect that the FC Exchange Sequence Initiative has been transferred to it and to begin transmitting the second FCP_DATA IU cannot start until the second FCP_XFER_RDY IU has been received, that is, until the transmission latency [C] of the second FCP_XFER_RDY IU has been incurred. Similarly, the transmission latency [E] associated with the second FCP_DATA IU cannot start until the second FCP_XFER_RDY IU has been received, that is, until the transmission latency [C] of the second FCP_XFER_RDY IU has been incurred and the initiator 102 processing time [D] has been incurred.

Figure 14:
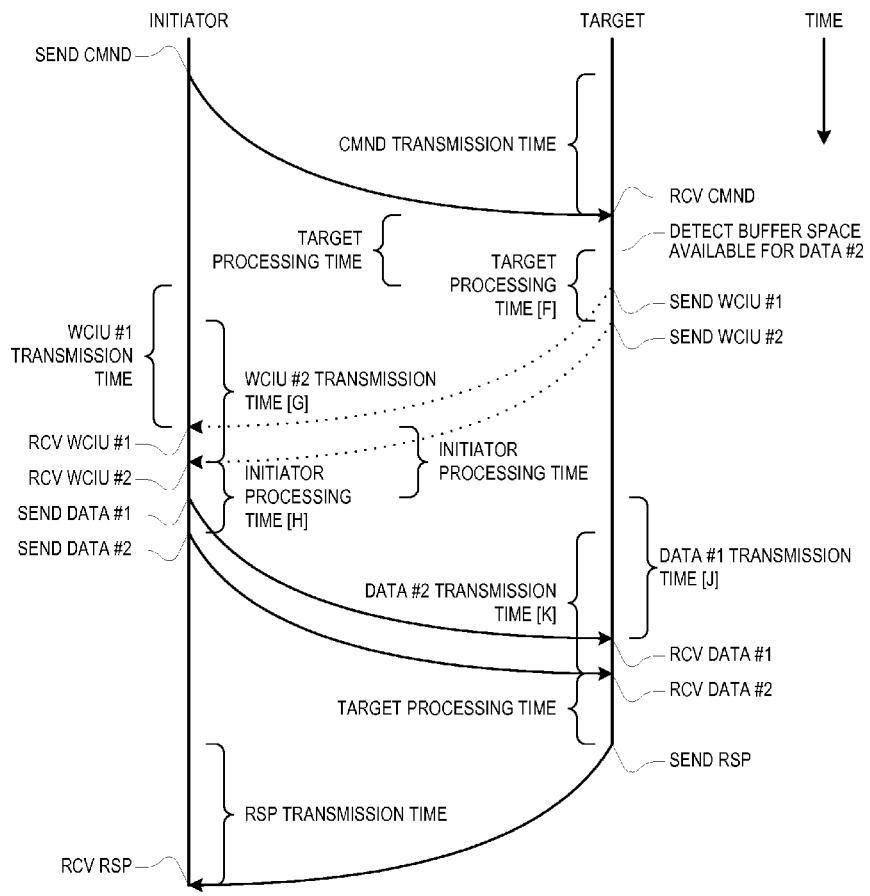
FIG. 14 is a timing diagram illustrating latencies associated with a FCP write I/O operation such as described in FIG. 8.

Referring now to FIG. 14, a timing diagram illustrating latencies associated with a FCP write I/O operation such as described in FIG. 8 is shown. The lines illustrating transmission of the write_control IUs 300 within the AWCE are shown as dotted lines in FIG. 14, whereas the lines illustrating transmission of the FCP_CMND, FCP_DATA and FCP_RSP IUs within the WIOE are shown as solid lines. As may be observed from FIG. 14, the total latency of the FCP write I/O operation employing the AWCE is potentially greatly reduced relative to the convention write I/O operation. First, because the target 104 does not have to wait for Sequence Initiative to be transferred to it by the data IU in order to request the next data transfer from the initiator 102, some or all of the target 104 processing latency [F] from detecting that buffer space has become available for the second data IU can be overlapped with, or hidden behind, the transmission latency [J] of the first data IU. In fact, in some cases as in the example of FIG. 14, the target 104 processing time [F] may even occur during the first write_control IU 300 transmission time and potentially even before the initiator 102 begins the first data IU transmission. Similarly, some or all of the transmission time [G] of the second write_control IU 300 may be hidden behind the transmission latency of the first data IU. These latency reductions or eliminations are made possible by the full-duplex communications afforded by the AWCE as described above. Second, because the initiator 102 does not have to wait for Sequence Initiative to be transferred to it by the data request IU in order to send the second data IU, some or all of the initiator 102 processing time [H] from receiving the second write_control IU 300 can be overlapped with, or hidden behind, the transmission latency [J] of the first data IU. In fact, in some cases as in the example of FIG. 14, the initiator 102 processing time [H] may even occur during the first data IU transmission time [J] and potentially even before the initiator 102 begins the first data IU transmission. Similarly, some of the transmission time [K] of the second data IU may be hidden behind the transmission latency [J] of the first data IU. Again, these latency reductions or eliminations are made possible by the full-duplex communications afforded by the AWCE.

It should be understood that FIG. 14 illustrates a relatively best case scenario and the amount of latency reduction enjoyed by other FCP write I/O operations may vary depending upon the conditions present, such as the time in which buffers become available, times associated with processing other write I/O operations, and the availability of transmission opportunity and bandwidth on the FC fabric 106.

It should be understood that the times shown in FIGS. 13 and 14 are not to scale and are not intended to show actual times, but are instead provided to illustrate the dependencies between the various FC frame transmission times and initiator 102 and target 104 processing times and the latencies induced by the dependencies.

Although embodiments have been described in which an asynchronous write control FC Exchange has been employed to reduce write I/O operation latency with respect to SCSI as the FC-4 upper level protocol (FCP), other embodiments are contemplated in which an asynchronous FC exchange may be employed to reduce write I/O latency with respect to other FC-4 upper level protocols.

Furthermore, although different write_control IU embodiments have been described, it should be understood that other embodiments may be employed, such as different FC frame types or values including enhancements of existing FC standard-defined frames or new FC frames whose types or values are currently reserved by the FC standards and left open for future expansion, so long at the target 104 is able to request data transfers from the initiator 102 within a different FC Exchange than the FC Exchange within which the initiator 102 sends the data IUs to the target 104.

Additionally, although embodiments have been described in which the FCP initiators and targets communicate via a FC fabric topology, other embodiments are contemplated in which the FCP initiators and targets communicate via a FC arbitrated loop topology or FC point-to-point topology using the AWCE scheme described herein.

Furthermore, although embodiments have been described in which the target 104 constantly holds the Sequence Initiative for the AWCE, other embodiments are contemplated in which the write_control IU transfers the AWCE Sequence Initiative to the initiator 102 and the initiator 102 sends an "ACK" IU in response to transfer the AWCE Sequence Initiative back to the target 104. The ACK IU may be another write_control IU, for example one in which the operation_type field 306 has a distinctive value to indicate that the initiator 102 is acknowledging receipt of the request_dataout_transfer operation_type 306 write_control IU and is now ready to receive another request_dataout_transfer write_control IU from the target 104. This embodiment provides a mechanism for the initiator 102 to pace the target 104. According to an expansion of this embodiment, the initiator 102 and target 104 establish a credit of write_control IUs, such that the target 104 is allowed to send only the established credit number of write_control IUs to the initiator 102 within the AWCE before it must wait for the initiator 102 to replenish its credit of write_control IUs. In this manner, the initiator 102 is enabled to impose flow control upon the target 104 at the write_control IU level. Still further, embodiments are contemplated in which the initiator 102 is not required to send the credit replenishments within the AWCE. In these embodiments, the initiator 102 and target 104 detect support for the AWCE feature and establish a credit for N outstanding write_control IUs. The N credits may apply only to a single FCP write I/O operation, or the credits may apply across all FCP write I/O operations between the initiator 102 N_port and the target 104 N_port. Subsequently, the target 104 sends write_control IUs within the AWCE and decrements its credit value, which may eventually reach zero, at which time the target 104 must stop sending write_control IUs. Eventually, the initiator 102 sends the target 104 a credit replenishment to the target 104, perhaps in the WIOE originated by the initiator 102, in response to which the target 104 increments its credit value and resumes sending write_control IUs, assuming it was blocked due to a zero credit value.

Finally, embodiments are contemplated in which the WIOE is effectively treated as unidirectional by the initiator 102 and target 104. More specifically, the target 104 firmware effectively ignores the Sequence Initiative bit of the F_CTL field of the FC frame headers of the FCP_CMND and FCP_DATA IUs even though they may be set to one to transfer the Sequence Initiative to the target 104. This embodiment may be particularly useful in the case where a target 104 includes hardware state machines that would be cost prohibitive to modify, but upon which hardware it is desirable to implement the full-duplex communication scheme described herein. In such embodiments, the target 104 may send a write_control IU 300 with a distinctive operation_type 306 value and payload equivalent to the FCP_RSP IU within the AWCE as a response IU; alternatively, the target 104 firmware could recognize that the last of the data for the write I/O operation was received in a data IU and receive the WIOE Sequence Initiative in order to send the FCP_RSP IU within the WIOE.

Embodiments described herein include the following potential advantages. First, employing the full-duplex communication between initiator and target afforded by the dual WIOE and AWCE FC Exchanges may reduce the latency associated with a FCP write I/O operation relative to conventional systems that perform a FCP write I/O operation on a single half-duplex exchange. Second, as a result of these latency reductions, which are discussed in more detail above, the target 104 may be enabled to request the data transfers (via the write_control IUs 300) in smaller chunks without incurring latency penalties that would be incurred by so doing in a conventional FCP write I/O operation. This has the advantage of potentially affording higher performance with lower contiguous buffer requirements in the target 104.

While various embodiments of the present invention have been described herein, it should be understood that they have been presented by way of example, and not limitation. It will be apparent to persons skilled in the relevant computing arts that various changes in form and detail can be made therein without departing from the scope of the invention. For example, software can enable the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known non-transitory computer usable medium such as magnetic tape, semiconductor, magnetic disk, or optical disc (e.g., CD-ROM, DVD-ROM, etc.), a network, or wire line, or other communications medium. Embodiments of the apparatus and method described herein may be included in an integrated circuit. Additionally, the apparatus and methods described herein may be embodied as a combination of hardware and software. Thus, the present invention should not be limited by any of the exemplary embodiments described herein, but should be defined only in accordance with the following claims and their equivalents. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A Fibre Channel (FC) Protocol for SCSI (FCP) target, comprising:
   a FC port; and
   a processor, adapted to communicate with a FCP initiator via the FC port;
   wherein the FCP target is configured to send one or more FC write control information units (IUs) to the FCP initiator within a first FC exchange to request a transfer of data associated with a FCP write command IU previously sent to the FCP target by the FCP initiator within a second FC exchange, without the FCP initiator first sending its sequence initiative in the second FC exchange;
   wherein the first FC exchange is distinct from the second FC exchange;
   wherein a payload of each of the one or more write control IUs comprises:
      an originator exchange identifier (OX_ID) value with which the FCP initiator originated the second FC exchange; and
      a responder exchange identifier (RX_ID) value assigned by the FCP target for the second FC exchange.

2. The FCP target of claim 1, wherein the FCP target is configured to send the one or more write control IUs within the first FC exchange concurrently with the FCP initiator sending one or more FCP data IU sequences within the second FC exchange to the FCP target.

3. The FCP target of claim 1, wherein the FCP target is further configured to send a second one or more write control IUs to the FCP initiator within the first FC exchange to request a transfer of data associated with a second FCP write command IU previously sent to the FCP target by the FCP initiator within a third FC exchange;
   wherein the first FC exchange is distinct from the third FC exchange;
   wherein a payload of each of the second one or more write control IUs comprises:
      an OX_ID value with which the FCP initiator originated the third FC exchange; and
      a RX_ID value assigned by the FCP target for the third FC exchange.

4. The FCP target of claim 1, wherein the payload of each write control IU of the one or more write control IUs further comprises: an indicator that instructs the FCP initiator whether to hold or transfer sequence initiative of the second FC exchange to the FCP target.

5. The FCP target of claim 1, wherein each write control IU of the one or more write control IUs comprises a new FCP IU previously undefined by the FCP-4 standard.

6. The FCP target of claim 1, wherein each write control IU of the one or more write control IUs comprises an enhanced FCP transfer ready (FCP_XFER_RDY) IU, wherein the payload of the write control IU is located in bits previously reserved by the FCP-4 standard.

7. The FCP target of claim 1, wherein the one or more write control IUs hold sequence initiative of the first FC exchange.

8. A Fibre Channel (FC) Protocol for SCSI (FCP) initiator, comprising:
   a FC port; and
   a processor, adapted to communicate with a FCP target via the FC port;
   wherein the FCP initiator is configured to receive one or more FC write control information units (IUs) from the FCP target within a first FC exchange requesting a transfer of data associated with a FCP write command IU previously sent to the FCP target by the FCP initiator within a second FC exchange, without the FCP initiator first sending its sequence initiative in the second FC exchange;
   wherein the first FC exchange is distinct from the second FC exchange;
   wherein a payload of each of the one or more write control IUs comprises:
      an originator exchange identifier (OX_ID) value with which the FCP initiator originated the second FC exchange; and
      a responder exchange identifier (RX_ID) value assigned by the FCP target for the second FC exchange.

9. The FCP initiator of claim 8, wherein the FCP initiator is configured to receive the one or more write control IUs within the first FC exchange concurrently with sending one or more FCP data IU sequences within the second FC exchange to the FCP target.

10. The FCP initiator of claim 8,
   wherein the FCP initiator is further configured to receive a second one or more write control IUs from the FCP target within the first FC exchange requesting a transfer of data associated with a second FCP write command IU previously sent to the FCP target by the FCP initiator within a third FC exchange;
   wherein the first FC exchange is distinct from the third FC exchange;
   wherein a payload of each of the second one or more write control IUs comprises:
      an OX_ID value with which the FCP initiator originated the third FC exchange; and
      a RX_ID value assigned by the FCP target for the third FC exchange.

11. The FCP initiator of claim 8, wherein the payload of each write control IU of the one or more write control IUs further comprises: an indicator that instructs the FCP initiator whether to hold or transfer sequence initiative of the second FC exchange to the FCP target.

12. The FCP initiator of claim 8, wherein each write control IU of the one or more write control IUs comprises a new FCP IU previously undefined by the FCP-4 standard.

13. The FCP initiator of claim 8, wherein each write control IU of the one or more write control IUs comprises an enhanced FCP transfer ready (FCP_XFER_RDY) IU, wherein the payload of the write control IU is located in bits previously reserved by the FCP-4 standard.

14. The FCP initiator of claim 8, wherein the one or more write control IUs hold sequence initiative of the first FC exchange.

15. The FCP initiator of claim 8, wherein the FCP write command IU sent to the FCP target by the FCP initiator holds sequence initiative of the second FC exchange.

16. A method, comprising:
    sending, by a Fibre Channel (FC) Protocol for SCSI (FCP) target, one or more FC write control information units (IUs) to an FCP initiator within a first FC exchange to request a transfer of data associated with a FCP write command IU previously sent to the FCP target by the FCP initiator within a second FC exchange, without the FCP initiator first sending its sequence initiative in the second FC exchange;
    wherein the first FC exchange is distinct from the second FC exchange;
    wherein a payload of each of the one or more write control IUs comprises:
        an originator exchange identifier (OX_ID) value with which the FCP initiator originated the second FC exchange; and
        a responder exchange identifier (RX_ID) value assigned by the FCP target for the second FC exchange.

17. The method of claim 16, wherein said sending the one or more write control IUs within the first FC exchange is performed concurrently with the FCP initiator sending one or more FCP data IU sequences within the second FC exchange to the FCP target.

18. The method of claim 16, wherein each write control IU of the one or more write control IUs comprises a new FCP IU previously undefined by the FCP-4 standard.

19. The method of claim 16, wherein each write control IU of the one or more write control IUs comprises an enhanced FCP transfer ready (FCP_XFER_RDY) IU, wherein the payload of the write control IU is located in bits previously reserved by the FCP-4 standard.

20. The method of claim 16, wherein the one or more write control IUs hold sequence initiative of the first FC exchange.

* * * * *